(12) United States Patent
Kawamura et al.

(10) Patent No.: US 11,581,552 B2
(45) Date of Patent: Feb. 14, 2023

(54) SHEET ATTACHING APPARATUS AND METHOD

(71) Applicant: HONDA MOTOR CO., LTD., Tokyo (JP)

(72) Inventors: Yoshinori Kawamura, Tochigi-ken (JP); Keiichi Shiraishi, Tochigi-ken (JP); Junichi Nakano, Tochigi-ken (JP); Toru Ikeda, Tochigi-ken (JP); Kunitoshi Sugaya, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 365 days.

(21) Appl. No.: 16/884,082

(22) Filed: May 27, 2020

(65) Prior Publication Data
US 2020/0388861 A1 Dec. 10, 2020

(30) Foreign Application Priority Data

May 28, 2019 (JP) ............................. JP2019-099253

(51) Int. Cl.
*H01M 8/0297* (2016.01)
*B32B 37/12* (2006.01)
(Continued)

(52) U.S. Cl.
CPC .......... *H01M 8/0297* (2013.01); *B32B 27/06* (2013.01); *B32B 27/304* (2013.01);
(Continued)

(58) Field of Classification Search
CPC ... B32B 2457/18; B32B 27/06; B32B 27/304; B32B 29/002; B32B 37/12;
(Continued)

(56) References Cited

U.S. PATENT DOCUMENTS

| 4,495,014 A | * | 1/1985 | Gebrian | ................... G03F 7/161 |
| | | | | 156/80 |
| 2014/0360675 A1 | * | 12/2014 | Gonda | ................... B62D 65/06 |
| | | | | 156/538 |

(Continued)

FOREIGN PATENT DOCUMENTS

| JP | 10-167559 | 6/1998 |
| JP | 2011-165460 | 8/2011 |

OTHER PUBLICATIONS

Japanese Office Action for Japanese Patent Application No. 2019-099253 dated Mar. 2, 2021.

*Primary Examiner* — Philip C Tucker
*Assistant Examiner* — Brian R Slawski
(74) *Attorney, Agent, or Firm* — Amin, Turocy & Watson, LLP

(57) ABSTRACT

A sheet attaching apparatus includes a gripping mechanism that grips one end portion, in a longitudinal direction, of a first sheet that has been drawn out from a first supply roll; a moving mechanism that allows the first sheet to be attached to a second sheet by moving the gripping mechanism to cause the first sheet to approach and contact the second sheet that passes through an attaching portion provided in a feeding path; and a releasing mechanism that releases a grip of the gripping mechanism on the first sheet, after the first sheet has contacted the second sheet.

7 Claims, 16 Drawing Sheets

(51) Int. Cl.
- *B32B 27/30* (2006.01)
- *B32B 29/00* (2006.01)
- *B32B 27/06* (2006.01)
- *H01M 8/1004* (2016.01)
- *B32B 38/00* (2006.01)
- *B29C 65/78* (2006.01)
- *B32B 37/00* (2006.01)
- *B32B 38/18* (2006.01)

(52) U.S. Cl.
CPC ............ *B32B 29/002* (2013.01); *B32B 37/12* (2013.01); *B32B 38/0004* (2013.01); *H01M 8/1004* (2013.01); *B29C 65/7841* (2013.01); *B32B 37/0046* (2013.01); *B32B 38/18* (2013.01); *B32B 2457/18* (2013.01)

(58) Field of Classification Search
CPC . B32B 37/0046; B32B 38/0004; B32B 38/18; H01M 4/88; H01M 8/00; H01M 8/02; H01M 8/0271; H01M 8/0297; H01M 8/1004; Y02E 60/50; B29C 65/7841
USPC ......... 156/60, 183, 185, 187, 191, 192, 277, 156/324, 349, 384, 443, 446, 459, 468, 156/538, 539, 543
See application file for complete search history.

(56) References Cited

U.S. PATENT DOCUMENTS

| | | | |
|---|---|---|---|
| 2015/0107764 A1* | 4/2015 | Katayama | H05K 3/281 156/248 |
| 2015/0251870 A1* | 9/2015 | Degawa | B32B 38/18 156/538 |

* cited by examiner

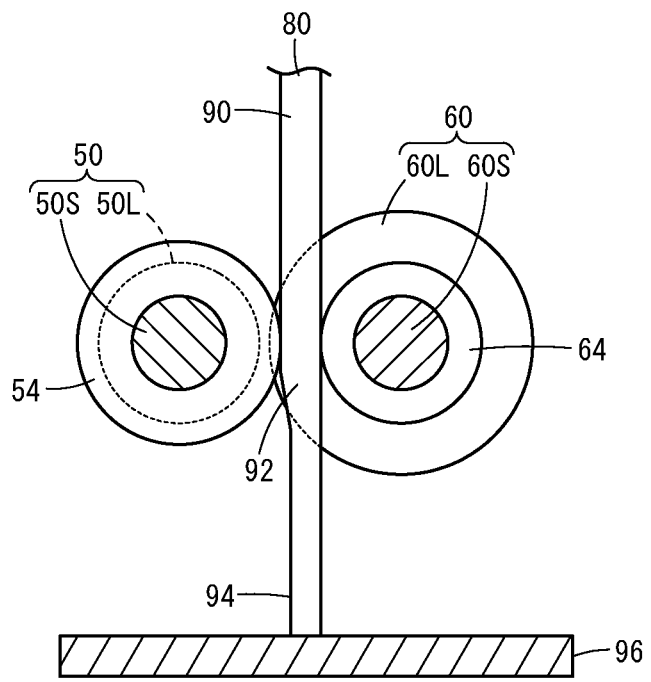
FIG. 13
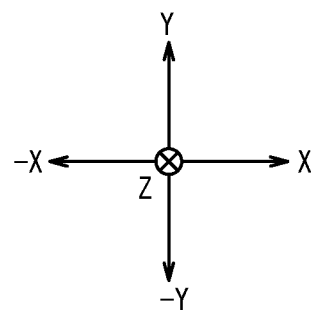

SHEET ATTACHING APPARATUS AND METHOD

CROSS-REFERENCE TO RELATED APPLICATION

This application is based upon and claims the benefit of priority from Japanese Patent Application No. 2019-099253 filed on May 28, 2019, the contents of which are incorporated herein by reference.

BACKGROUND OF THE INVENTION

Field of the Invention

The present invention relates to a sheet attaching apparatus and method for stacking and attaching a first sheet onto a second sheet.

Description of the Related Art

A fuel cell includes therein a plurality of power generation cells. Each power generation cell includes a membrane electrode assembly and a pair of separators that sandwich this membrane electrode assembly. The membrane electrode assembly includes a solid polymer electrolyte membrane (PEM) that is a thin film of perfluorosulfonic acid containing water, and an anode and cathode that sandwich the PEM. The membrane electrode assembly is formed by being cut from a sheet obtained by attaching the anode and cathode to the PEM.

Japanese Laid-Open Patent Publication No. 2011-165460 discloses an apparatus (and method) for attaching a shape-retaining film (sheet) to a polymer film (sheet). This apparatus draws out the polymer film from a supply roll, draws out the shape-retaining film from a retaining film supply apparatus, and, after attaching these films to each other, winds the resulting sheet on a winding roll.

SUMMARY OF THE INVENTION

In the conventional technology disclosed in Japanese Laid-Open Patent Publication No. 2011-165460 or the like, the apparatus is operated after the initial attachment of the two sheets to each other has been performed through manual labor by a worker. The work of correctly attaching these two sheets is difficult and requires skill.

The present invention takes the above problem into consideration, and it is an object of the present invention to provide a sheet attaching apparatus and method that can easily perform the work relating to the attachment of two sheets.

A first aspect of the present invention is a sheet attaching apparatus that stacks and attaches a first sheet onto a second sheet, the sheet attaching apparatus comprising a first supply roll that has the first sheet wound thereon and has an axial direction parallel to a prescribed direction; a second supply roll that has the second sheet wound thereon and has an axial direction parallel to the prescribed direction; a recovery roll configured to recover the second sheet to which the first sheet is attached; a feeding path that is formed from the second supply roll to the recovery roll; a gripping mechanism configured to grip one end portion, in a longitudinal direction, of the first sheet that has been drawn out from the first supply roll; a moving mechanism configured to allow the first sheet to be attached to the second sheet by moving the gripping mechanism to cause the first sheet to approach and contact the second sheet that passes through an attaching portion provided in the feeding path; and a releasing mechanism configured to release a grip of the gripping mechanism on the first sheet, after the first sheet has contacted the second sheet.

A second aspect of the present invention is a sheet attaching method for stacking and attaching a first sheet onto a second sheet, at least one of the first sheet and the second sheet being adhesive, the sheet attaching method comprising a gripping step of drawing out the first sheet from a first supply portion and gripping one end portion of the first sheet in a longitudinal direction with a gripping mechanism; a first feeding step of drawing out the second sheet from a second supply portion, causing the second sheet to pass through an attaching portion, and recovering the second sheet with a recovering portion; a moving step of moving the gripping mechanism to cause the first sheet to approach the second sheet passing through the attaching portion; an attaching step of causing the first sheet to contact and attach to the second sheet at a position of the attaching portion; a grip releasing step of, after the attaching step, releasing a grip of the gripping mechanism on the first sheet; and a second feeding step of, after the grip releasing step, recovering the first sheet and the second sheet with the recovering portion while attaching the first sheet and the second sheet to each other at the attaching portion.

According to the present invention, the work of attaching the first sheet to the second sheet is made easy, and the worker does not need a high degree of skill.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 13 shows a portion of the gripping mechanism when releasing the first sheet;

DESCRIPTION OF THE PREFERRED EMBODIMENTS

The following describes in detail preferred embodiments of a sheet attaching apparatus and method according to the present invention, while referencing the accompanying drawings.

1. Membrane Electrode Assembly 200

1.1. Structure of Membrane Electrode Assembly 200

Figure 1:
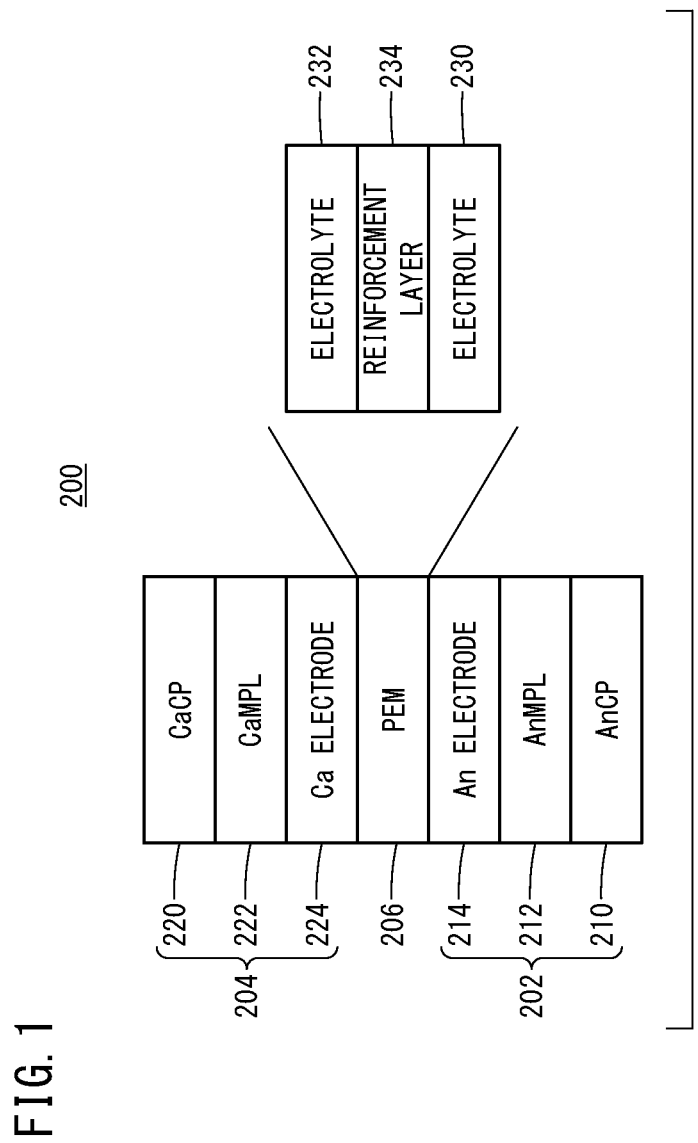
FIG. 1 schematically shows a membrane electrode assembly.

The following describes a structure of a membrane electrode assembly 200 manufactured according to the present embodiment, using FIG. 1. The membrane electrode assembly 200 includes an An (anode) layer 202 positioned on one side, a Ca (cathode) layer 204 positioned on the other side, and a PEM 206 sandwiched between the An layer 202 and the Ca layer 204. The An layer 202 includes an AnCP (carbon paper) 210, an AnMPL (porous thin film) 212, and an An electrode 214, as layers in order from the outside to the inside. Similarly, the Ca layer 204 includes a CaCP 220, a CaMPL 222, and a Ca electrode 224, as layers in order from the outside to the inside. The PEM 206 includes an An-side electrolyte 230, a Ca-side electrolyte 232, and a reinforcement layer 234 sandwiched by these two electrolytes 230 and 232. Adhesive PTFE (polytetrafluoroethylene), for example, is used as the reinforcement layer 234. The following describes an apparatus and method for manufacturing the membrane electrode assembly 200 as a sheet.

1.2. Membrane Electrode Assembly 200 Manufacturing Procedure

The membrane electrode assembly 200 is manufactured using the following procedure, for example. The AnCP 210 as a sheet on which the AnMPL 212 is layered and the CaCP 220 as a sheet on which the CaMPL 222 is layered are prepared in advance. As a first step, the Ca electrode 224 is applied as an ink to the CaMPL 222 side of the CaCP 220, to form the Ca layer 204. As a second step, while the electrolyte 232 (perfluorosulfonic acid) is being applied as an ink to the Ca electrode 224, the reinforcement layer 234 is attached as a sheet. As a third step, the electrolyte 230 (perfluorosulfonic acid) is applied as an ink to the reinforcement layer 234 to form the PEM 206 and the Ca layer 204. As a fourth step, while the An electrode 214 is being applied as an ink to the AnMPL 212 side of the AnCP 210, the PEM 206 and the Ca layer 204 are attached. The membrane electrode assembly 200 is cut out from the sheet manufactured through the steps described above. A sheet attaching apparatus 10 described below can perform the work of the second step and the fourth step among the above steps.

2. Configuration of Sheet Attaching Apparatus 10

Figure 2:
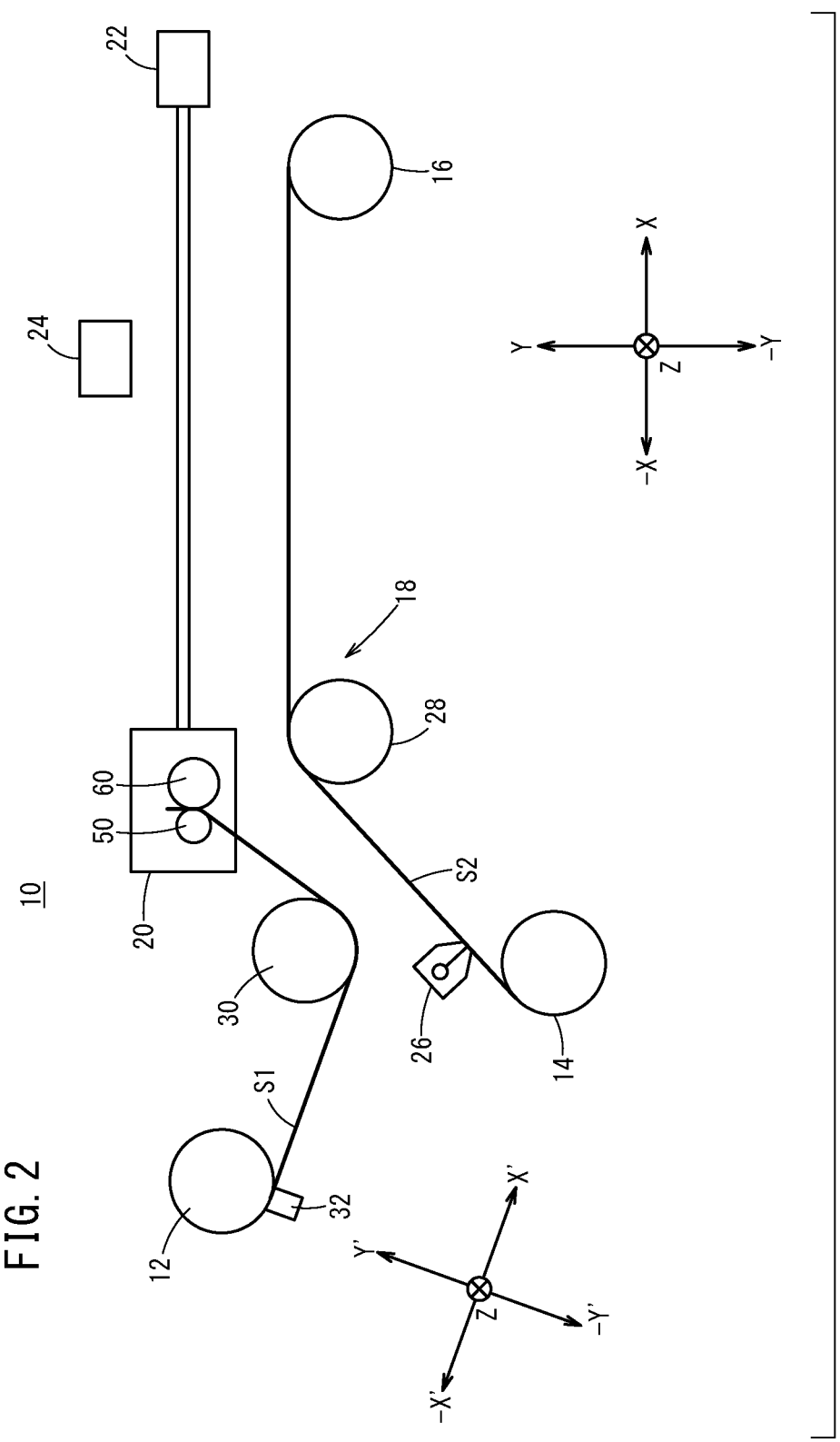
FIG. 2 shows a configuration of a sheet attaching apparatus.

The following describes the configuration of the sheet attaching apparatus 10 using FIG. 2. The sheet attaching apparatus 10 includes a first supply roll 12, a second supply roll 14, a recovery roll 16, a feeding path 18, a gripping mechanism 20, a moving mechanism 22, and a releasing mechanism 24. For the sake of convenience in the following description, directions that are orthogonal to each other are set as an X direction and a Y direction, and a direction orthogonal to both the X direction and the Y direction is set as a Z direction. When a "−" sign is affixed to the X, Y, or Z character, this indicates the opposite direction to the corresponding X, Y, or Z direction. In the present embodiment, the Y direction is a vertically upward direction.

The first supply roll 12 has a first sheet S1 wound thereon in advance, and an axial direction thereof is parallel to the Z direction. The Z direction is parallel to the width direction of the first sheet S1. In the second step of section [1.2] above, the first sheet S1 is the reinforcement layer 234 formed as a sheet, for example. Furthermore, in the fourth step of section [1.2] above, the first sheet S1 is the PEM 206 and the Ca layer 204 formed as a sheet, for example.

The second supply roll 14 has a second sheet S2 wound thereon in advance, and an axial direction thereof is parallel to the Z direction. The Z direction is parallel to the width direction of the second sheet S2. In the second step of section [1.2] above, the second sheet S2 is the Ca electrode 224 formed as a sheet, for example. Furthermore, in the fourth step of section [1.2] above, the second sheet S2 is the AnCP 210 formed as a sheet, for example.

The axial direction of the recovery roll 16 is parallel to the Z direction, and the recovery roll 16 winds and recovers the second sheet S2 to which the first sheet S1 is attached.

The feeding path 18 is formed from the second supply roll 14 to the recovery roll 16. The feeding path 18 includes an ink applying section 26 and an attaching portion 28, in order from the upstream side. The ink applying section 26 applies ink to one surface of the second sheet S2 fed from the second supply roll 14 toward the recovery roll 16. The attaching portion 28 is a feeding roller whose axial direction is parallel to the Z direction. The attaching portion 28 bends the feeding path 18 in a manner to protrude to the first sheet S1 side, to change the feeding direction of the second sheet S2. In this attaching portion 28, the first sheet S1 and the second sheet S2 contact and are attached to each other.

The gripping mechanism 20 grips one end portion, in a longitudinal direction, of the first sheet S1 that has been drawn out from the first supply roll 12. The structure of the gripping mechanism 20 is described below in section [3].

The moving mechanism 22 moves the gripping mechanism 20 toward the X-direction side or the −X-direction side. The moving mechanism 22 allows the first sheet S1 to be attached to the second sheet S2 by moving the gripping mechanism 20 from an initial position toward the X-direction side to cause the first sheet S1 to approach and contact the second sheet S2 that passes through the attaching portion 28 provided in the feeding path 18. The moving mechanism 22 includes a drive source (not shown in the drawings) such as an electric motor, for example, and a drive mechanism (not shown in the drawings) that transmits the drive force generated by the drive source to the gripping mechanism 20.

The releasing mechanism 24 is arranged in the movement path of the moving mechanism 22, and releases the first sheet S1 from the grip of the gripping mechanism 20 after the first sheet S1 and the second sheet S2 have contacted each other. The structure of the releasing mechanism 24 is described in section [3] below, along with the structure of the gripping mechanism 20.

3. Structures of Gripping Mechanism 20 and Releasing Mechanism 24

The following describes the structures of the gripping mechanism 20 and the releasing mechanism 24 using FIGS. 3 to 6.

The gripping mechanism 20 includes a first gripping portion and a second gripping portion, which approach each other to grip one end portion of the first sheet S1 in the longitudinal direction. Specifically, as shown in FIGS. 4 and 5, the gripping mechanism 20 includes a first roller 50 (first gripping portion) and a second roller 60 (second gripping portion) that extend in the width direction of the first sheet S1 (Z direction). The first roller 50 includes first end portions 50S with a small diameter at both ends thereof in the width direction, and a first intermediate portion 50L with a large diameter between the two first end portions 50S. The first roller 50 is supported to be rotatable around an axis parallel to the Z direction, by a first outer bearing 58 that is described further below. The second roller 60 includes second end portions 60S with a small diameter at both ends thereof in the width direction, and a second intermediate portion 60L with a large diameter between the two second end portions 60S. The second roller 60 is supported to be rotatable around an axis parallel to the Z direction, by a second outer bearing 68 (FIG. 3) that is described further below. The second roller 60 is arranged farther on the X-direction side than the first roller 50. Furthermore, the second intermediate portion 60L has a larger diameter than the first intermediate portion 50L. The first intermediate portion 50L and the second intermediate portion 60L grip the first sheet S1 by line contact.

As shown in FIG. 4, a first inner bearing 54, a first gear 52, and the first outer bearing 58 are provided in each first end portion 50S in the stated order toward the outside. The first inner bearing 54, the first gear 52, and the first outer bearing 58 are press-fitted into the first end portion 50S. Similarly, a second inner bearing 64 (FIG. 5), a second gear 62 (FIG. 6), and the second outer bearing 68 (FIG. 3) are provided in each second end portion 60S in the stated order toward the outside. The second inner bearing 64, the second gear 62, and the second outer bearing 68 are press-fitted into the second end portion 60S. The first gear 52 and the second gear 62 are rotation stoppers. A first stopper 56 provided on a floor portion 96 enters between the teeth of the first gear 52, thereby making rotation of the first gear 52 impossible, and as a result, rotation of the first roller 50 becomes impossible. Similarly, a second stopper 66 provided on the floor portion 96 enters between the teeth of the second gear 62, thereby making rotation of the second gear 62 impossible, and as a result, rotation of the second roller 60 becomes impossible.

Figure 3:
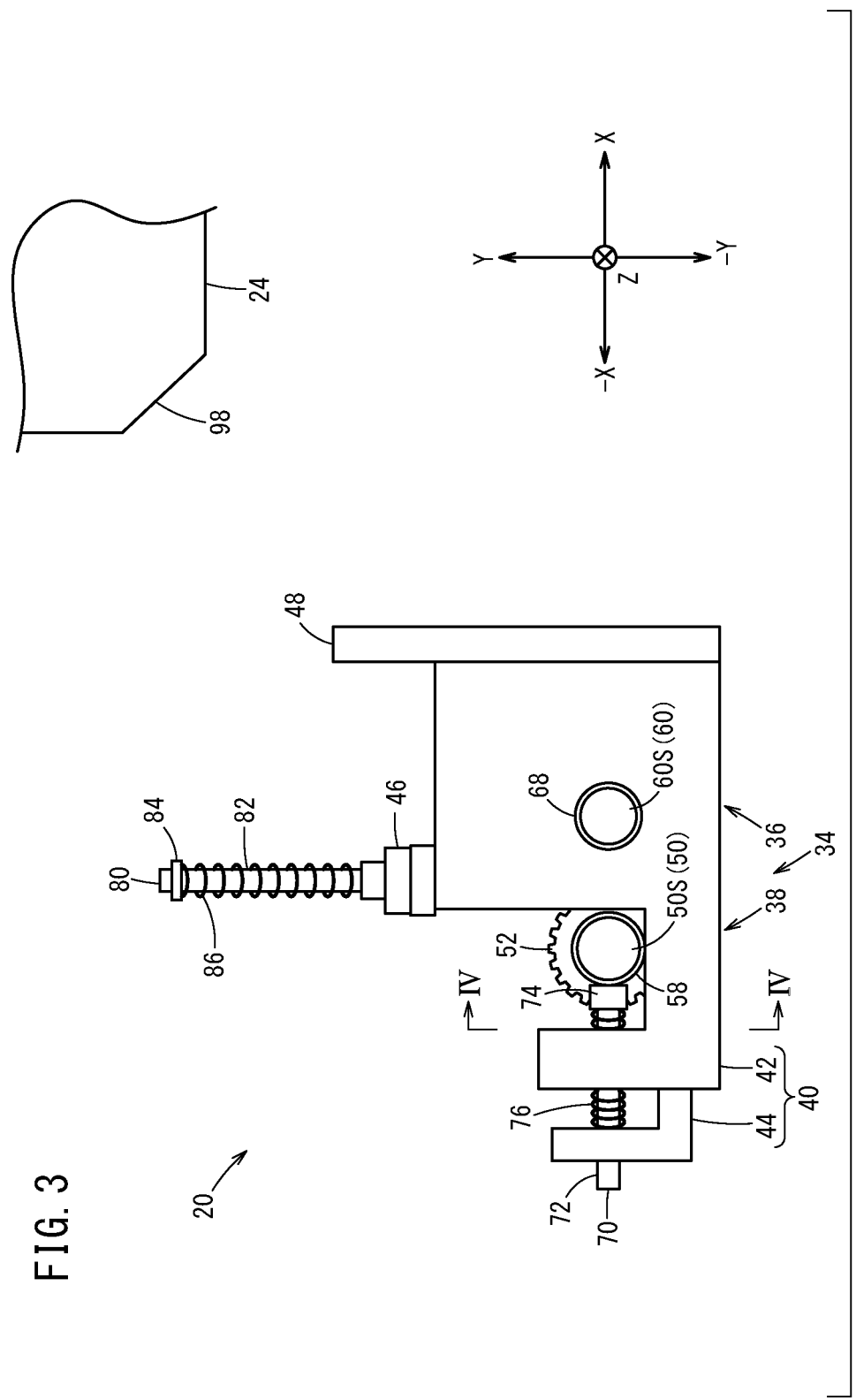
FIG. 3 shows side surfaces of a gripping mechanism and a releasing mechanism.
Figure 4:
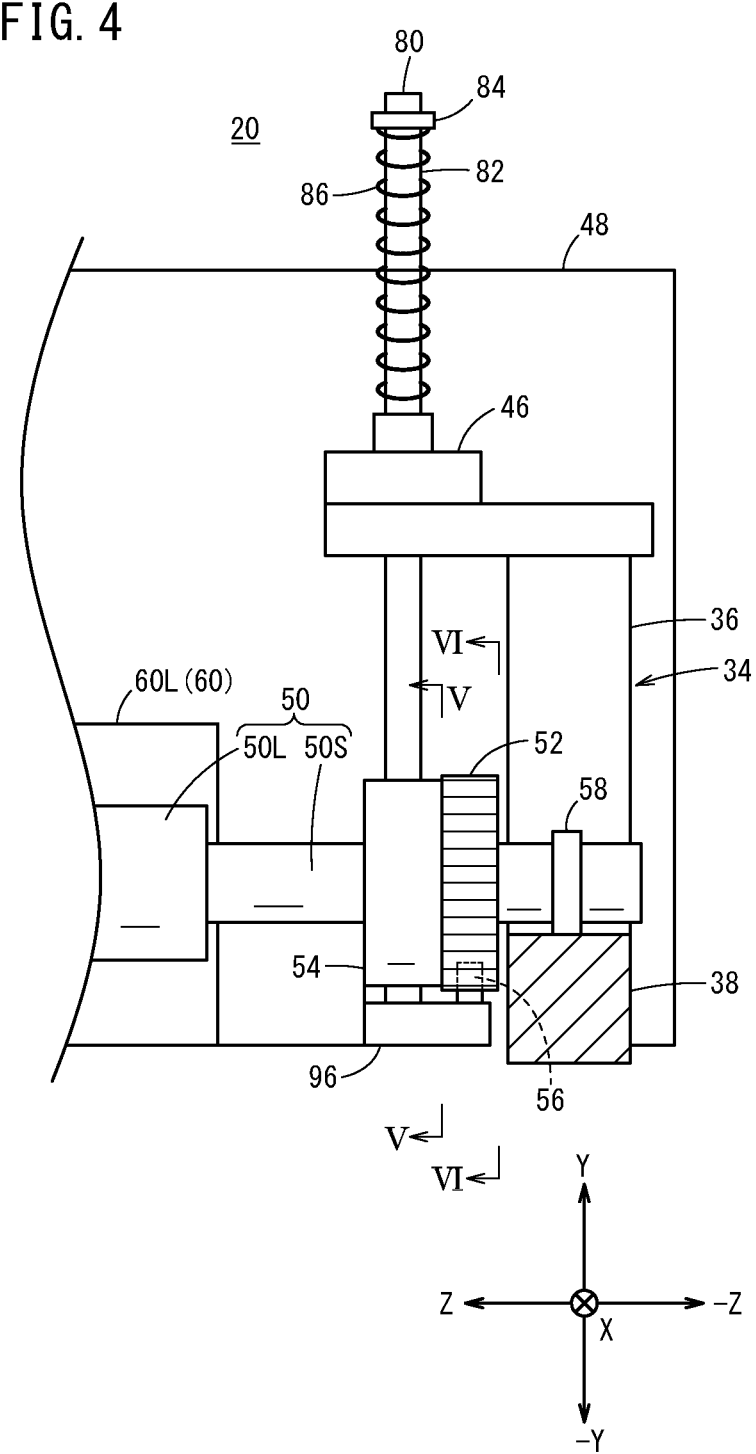
FIG. 4 shows a cross section over the line IV-IV in FIG. 3.
Figure 5:
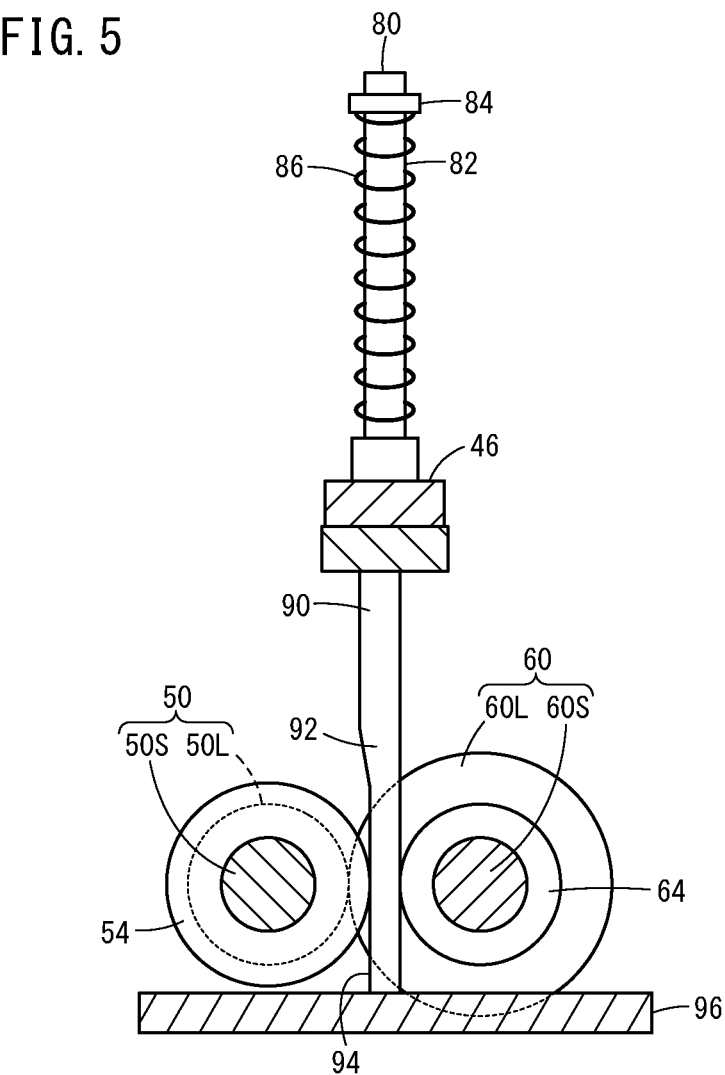
FIG. 5 shows a cross section over the line V-V in FIG. 4.

As shown in FIGS. 3 and 4, the gripping mechanism 20 includes a pair of support portions 34 that support the first end portions 50S of the first roller 50 and the second end portions 60S of the second roller 60. FIGS. 3 and 4 show a support structure on the −Z-direction side. The support portion 34 includes a second roller support portion 36, a first roller support portion 38, and a plunger support portion 40, connected in order from the X-direction side toward the −X-direction side.

The second roller support portion 36 supports the second outer bearing 68. The surface of the first roller support portion 38 on the Y-direction side has a shape that is recessed toward the −Y-direction side, compared to the surrounding area (the second roller support portion 36 and the plunger support portion 40). The first roller support portion 38 supports the first outer bearing 58 on the Y-direction-side surface thereof. In other words, the first outer bearing 58 is mounted on the Y-direction-side surface of the first roller support portion 38.

The plunger support portion 40 includes a first support section 42 and a second support section 44. The second support section 44 is L-shaped when viewed from the −Z-direction side, and protrudes in the −X direction from the first support section 42. The plunger support portion 40 supports a plunger 70.

The plunger 70 includes a first trunk portion 72 with a small diameter and a first head portion 74 with a large diameter. The plunger 70 extends from the −X-direction side to the X-direction side. Furthermore, the first trunk portion 72 is inserted through a first spring 76. The first trunk portion 72 and the first spring 76 are inserted through the first support section 42. The end portion of the first spring 76 on the −X-direction side contacts the end surface of the second support section 44 on the X-direction side, and the end portion of the first spring 76 on the X-direction side contacts the end surface of the first head portion 74 on the −X-direction side. Furthermore, the end surface of the first head portion 74 of the plunger 70 on the X-direction side contacts the first outer bearing 58. Therefore, the plunger 70 is biased toward the X-direction side by the first spring 76, and presses the first roller 50 toward the X-direction side.

A rod support portion 46 is provided on the Y-direction-side surface of the second roller support portion 36. The rod support portion 46 supports a rod 80. The rod 80 includes a second trunk portion 82 with a small diameter and a second head portion 84 with a large diameter. The rod 80 extends from the −Y-direction side to the Y-direction side. Furthermore, the second trunk portion 82 is inserted through a second spring 86, the rod support portion 46, and the second roller support portion 36. An end portion of the second spring 86 on the −Y direction side contacts the end surface of the rod support portion 46 on the Y-direction side, and the end portion of the second spring 86 on the Y-direction side contacts the end surface of the second head portion 84 on the −Y-direction side.

As shown in FIG. 5, the second trunk portion 82 of the rod 80 is inserted through the rod support portion 46, and includes an expanded width portion 90, an extending portion 92, and a narrowed width portion 94 in the stated order in the −Y direction. The expanded width portion 90 is a region where the length in the X direction is relatively long. The narrowed width portion 94 is a region where the length in the X direction is relatively short. The extending portion 92 is a region where the length in the X direction becomes gradually shorter toward the −Y direction side. The X-direction-side surface of the extending portion 92 is flush with the X-direction-side surface of the expanded width portion 90 and the X-direction-side surface of the narrowed width portion 94. On the other hand, the −X-direction-side surface of the extending portion 92 is inclined relative to the −X-direction-side surface of the expanded width portion 90 and the −X-direction-side surface of the narrowed width portion 94. The −X-direction side surface of the second trunk portion 82 contacts an outer portion of the first inner bearing 54, and the X-direction-side surface of the second trunk portion 82 contacts an outer portion of the second inner bearing 64. The end portion of the narrowed width portion 94 on the −Y-direction side is connected to the floor portion 96.

Figure 6:
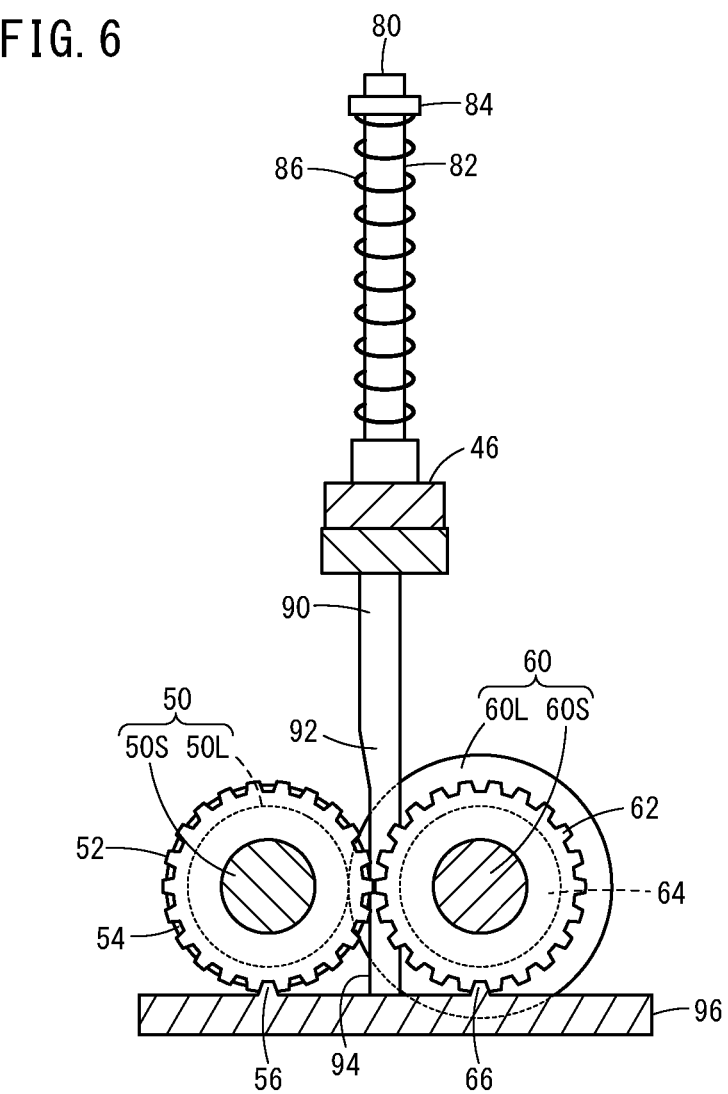
FIG. 6 shows a cross section over the line VI-VI in FIG. 4.

As shown in FIGS. 4 to 6, the floor portion 96 is arranged on the −Y-direction side of the first inner bearing 54, the first gear 52, the second inner bearing 64, and the second gear 62. The first stopper 56 and the second stopper 66 that protrude toward the Y-direction side are provided on the Y-direction-side surface of the floor portion 96. In a state where the rod 80 is not in contact with a contact portion 98 of the releasing mechanism 24, the floor portion 96 is positioned farthest to the Y-direction side. In this state, the first stopper 56 enters between the teeth of the first gear 52, and the second stopper 66 enters between the teeth of the second gear 62.

As shown in FIG. 3, the X-direction-side end portion of the support portion 34 on the Z-direction side and the X-direction-side end portion of the support portion 34 on the −Z-direction side are connected to a board 48. The board 48 extends from the −Z-direction side toward the Z-direction side. The board 48 is connected to the moving mechanism 22 described above. With such a structure, the gripping mechanism 20 is movable in the X direction and the −X direction.

As shown in FIG. 3, the releasing mechanism 24 is arranged on the X-direction side of the gripping mechanism 20. The releasing mechanism 24 is arranged at a position in contact with the second head portion 84 of the rod 80, which is a position where the gripping mechanism 20 moves to when the first sheet S1 and the second sheet S2 are in contact. The releasing mechanism 24 includes the contact portion 98 in the path along which the second head portion 84 of the rod 80 moves in the X direction. The contact portion 98 has an inclined surface that protrudes farther toward the −Y-direction side progressing toward the X-direction side.

4. Structure of Cutting Mechanism 32 and First Sheet S1 Cutting Operation

As shown in FIG. 2, the sheet attaching apparatus 10 includes a cutting mechanism 32 arranged near the first supply roll 12. The cutting mechanism 32 manually or automatically cuts the first sheet S1.

Figure 7:
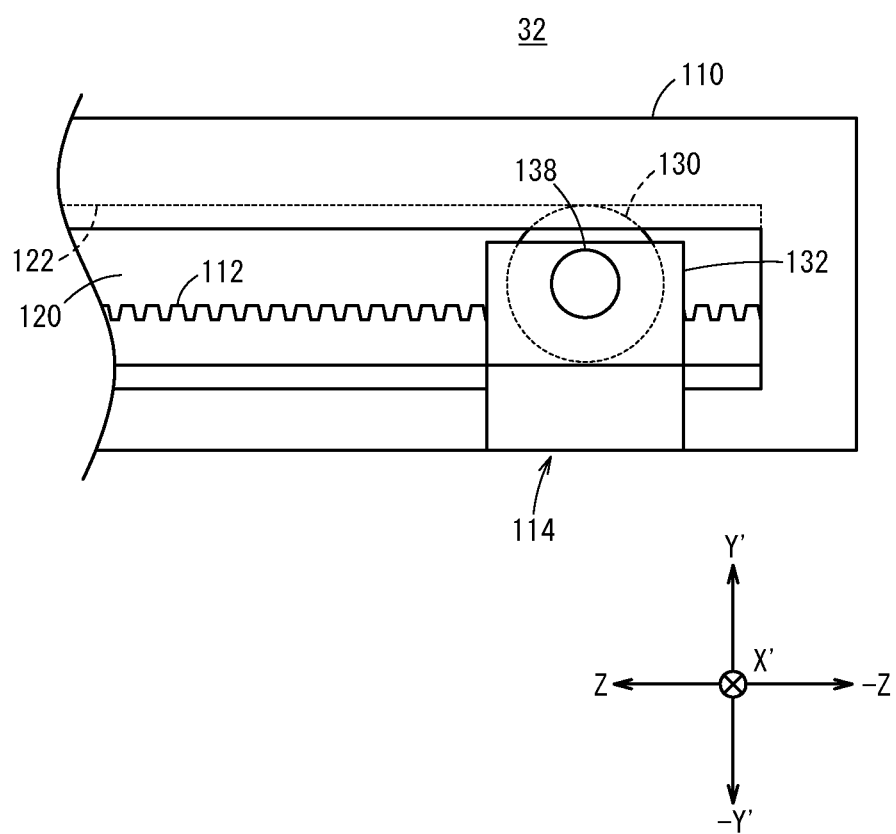
FIG. 7 shows a front surface of a cutting mechanism.

As shown in FIG. 7, the cutting mechanism 32 includes a frame 110, a rack gear 112, and a cutter 114. For the sake of convenience in the following description, directions orthogonal to each other are set as an X' direction and a Y' direction, and a direction orthogonal to both the X' direction and the Y' direction is set as the Z direction. Furthermore, when a "−" sign is affixed to the X' or Y' character, this indicates the opposite direction to the corresponding X' or Y' direction. The X' direction may be the same as the X direction described above, and the Y' direction may be the same as the Y direction described above.

A passage opening 120, through which the first sheet S1 passes from the −X'-direction side (the side toward the viewer in the plane of FIG. 7) toward the X'-direction side (the side away from the viewer in the plane of FIG. 7), is formed in the frame 110. In the frame 110 positioned along the peripheral edge of the passage opening 120, a groove 122, which opens on the passage opening 120 side and extends from the −Z-direction side toward the Z-direction side, is formed in the portion of the frame 110 positioned on the Y'-direction side. Furthermore, in the frame 110 positioned along the peripheral edge of the passage opening 120, the rack gear 112 that extends from the −Z-direction side toward the Z-direction side is formed in the portion of the frame 110 positioned on the −Y'-direction side.

Figure 8:
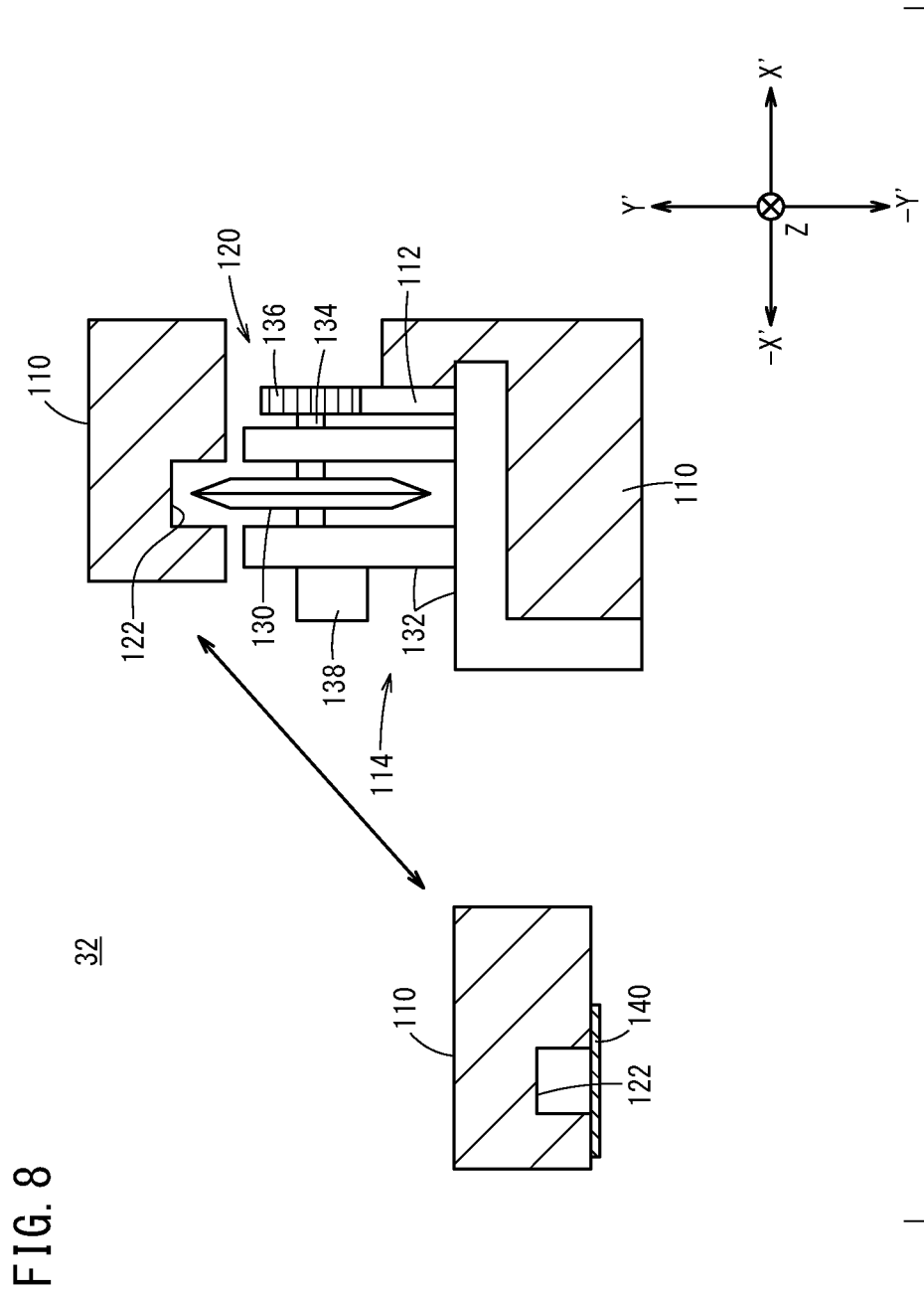
FIG. 8 is a schematic view of a cross section of the cutting mechanism.

As shown in FIG. 8, the cutter 114 includes a rotating cutter 130, a cutter holder 132, a shaft member 134, a pinion gear 136, and a grip 138. The rotating cutter 130 is circular with a blade on the outer edge thereof, and the blade on the Y'-direction side is arranged inside the groove 122. The shaft member 134 passes through the center of the rotating cutter 130 and is fixed. The shaft member 134 extends in the X' direction, and is rotatably supported by the cutter holder 132. The X'-direction side of the shaft member 134 penetrates through the cutter holder 132, and the pinion gear 136 is fixed to the X'-direction-side end portion of the shaft member 134. The pinion gear 136 and the rack gear 112 mesh with each other. The cutter holder 132 is fitted into the frame 110, and can slide in the Z direction or −Z direction along the frame 110. The grip 138 is attached to the cutter holder 132 and protrudes toward the −X'-direction side.

When the cutter holder 132 slides along the frame 110, the rotating cutter 130 and the pinion gear 136 meshing with the rack gear 112 rotate. Therefore, the first sheet S1 that passes through the passage opening 120 is cut along the groove 122.

In a case where the first sheet S1 is a PTFE sheet with high extensibility, it is preferable to cover an open portion of the groove 122 with tape 140, as shown in FIG. 8, in order to more accurately cut the PTFE sheet. The material of the tape 140 is preferably a material that can be cut easily by the rotating cutter 130 and has a certain degree of strength, and is preferably polyester, kapton, cellophane, or the like, for example. By covering the open portion of the groove 122 with the prescribed tape 140, the tape 140 is applied to the back surface of the first sheet S1 when the cutting by the rotating cutter 130 is performed, which makes it more difficult for the first sheet S1 to move, thereby making it possible to more accurately cut the first sheet S1. Furthermore, since the tape 140 is applied to the back surface, it is possible to prevent a decrease in the cutting force caused by the first sheet S1 bending and entering inside the groove 122. Furthermore, by simultaneously cutting the tape 140 along with the first sheet S1, it is possible to avoid braking the rotation of the blade of the rotating cutter 130, thereby preventing damage to the blade.

In the present embodiment, the attachment of the tape 140 to the frame 110 and the sliding of the cutter 114 are performed by a worker. However, the cutting mechanism 32 may include an electric motor or the like, and the sliding of the cutter 114 may be performed automatically.

5. Procedure of Sheet Attachment Process

The following describes a series of procedures for a sheet attachment process, using FIGS. 2 and 9 to 16.

Figure 9:
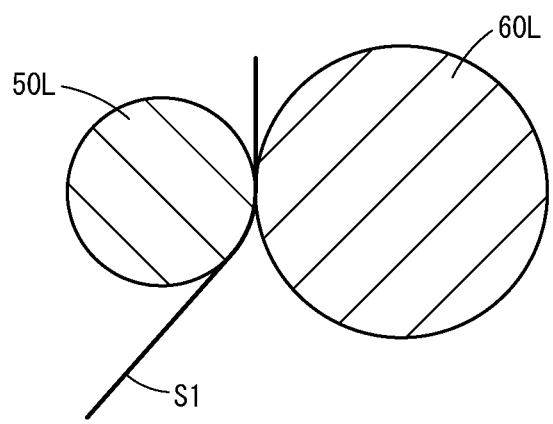
FIG. 9 shows a first roller and a second roller when gripping a first sheet.

As shown in FIG. 2, the gripping mechanism 20 is first positioned at the initial position, i.e. on the −X-direction side. The worker draws out the first sheet S1 from the first supply roll 12 and grips, with the first roller 50 and the second roller 60 of the gripping mechanism 20, one end portion in the longitudinal direction of the first sheet S1 that has passed through an intermediate roller 30. When the first roller 50 is manually pulled toward the −X-direction side, a space is generated between the first intermediate portion 50L of the first roller 50 and the second intermediate portion 60L of the second roller 60, and therefore the first sheet S1 can be held in the space between these portions. When the worker releases the first roller 50, the first outer bearing 58 is pressed toward the X-direction side by the plunger 70. Then, as shown in FIG. 9, the first sheet S1 is gripped by the first intermediate portion 50L and the second intermediate portion 60L.

Figure 10:
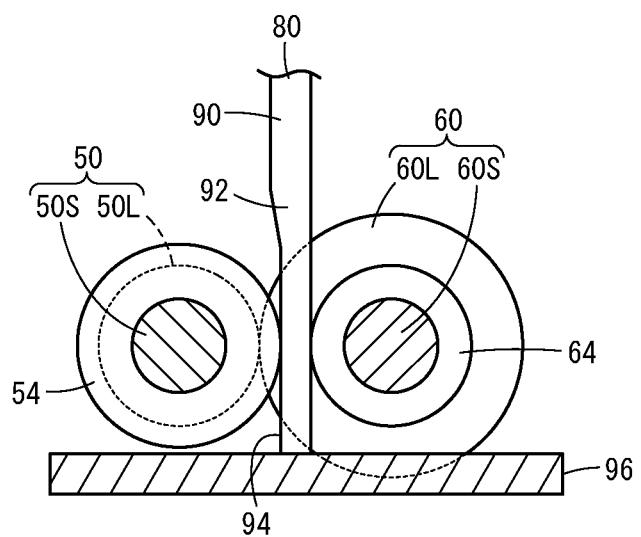
FIG. 10 shows a portion of the gripping mechanism when gripping the first sheet.
Figure 11:
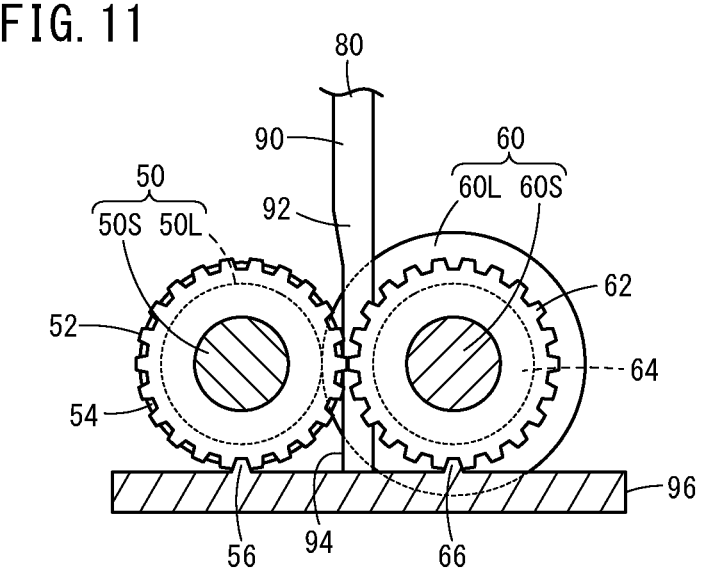
FIG. 11 shows a portion of the gripping mechanism when gripping the first sheet.

At this time, as shown in FIG. 10, the narrowed width portion 94 of the rod 80 contacts the first inner bearing 54 and the second inner bearing 64. Specifically, the first roller 50 is pressed toward the X-direction side by the plunger 70 that contacts the first outer bearing 58, but since the movement toward the X-direction side is restricted by the narrowed width portion 94 contacting the first inner bearing 54, the first roller 50 becomes fixed at a certain position. Furthermore, as shown in FIG. 11, the first stopper 56 enters between the teeth of the first gear 52 to stop the rotation of the first gear 52. Similarly, the second stopper 66 enters between the teeth of the second gear 62 to stop the rotation of the second gear 62. Therefore, the first sheet S1 does not fall due to rotation of the first roller 50 or the second roller 60.

Next, the worker draws out the second sheet S2 from the second supply roll 14, attaches one end portion of the second sheet S2 in the longitudinal direction to the recovery roll 16, and causes a feeding apparatus (not shown in the drawings) to operate. As a result, the second sheet S2 is fed from the second supply roll 14 to the recovery roll 16. Next, the worker manipulates an activation switch of the moving mechanism 22 to cause the moving mechanism 22 to operate. The moving mechanism 22 moves the gripping mechanism 20 toward the X-direction side. The movement velocity of the gripping mechanism 20 is set to be substantially equal to the feeding velocity of the second sheet S2. In accordance with the movement of the gripping mechanism 20, the first sheet S1 is drawn out from the first supply roll 12. Furthermore, as the intermediate roller 30 and the gripping mechanism 20 separate from each other, the first sheet S1 approaches the second sheet S2 passing through the attaching portion 28.

Figure 12:
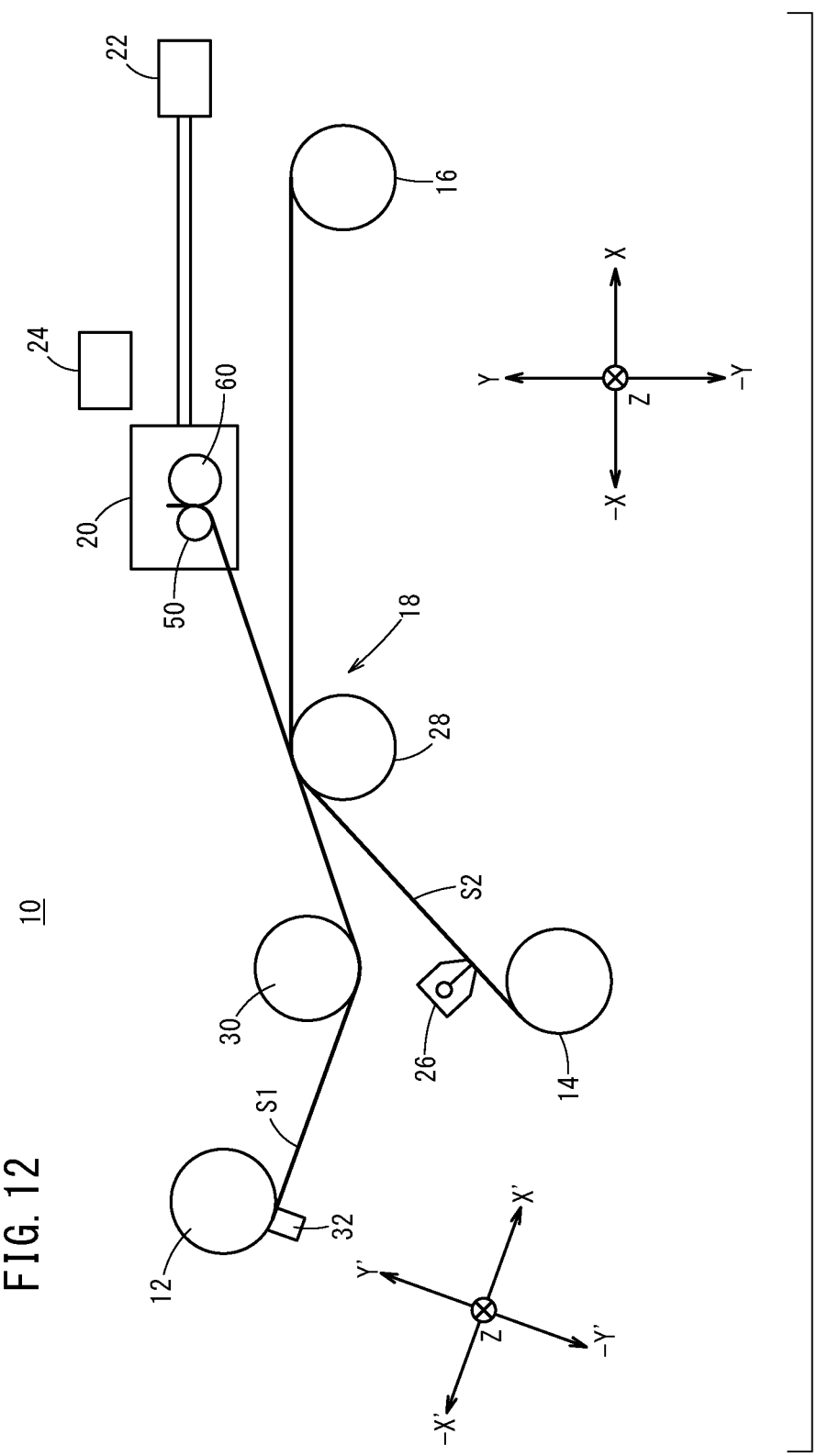
FIG. 12 shows a configuration of the sheet attaching apparatus.

As shown in FIG. 12, when the gripping mechanism 20 moves by a prescribed distance toward the X-direction side, the first sheet S1 contacts and becomes attached to the second sheet S2 at the attaching portion 28. At this time, the contact portion 98 of the releasing mechanism 24 shown in FIG. 3 contacts the second head portion 84 of the rod 80.

Figure 14:
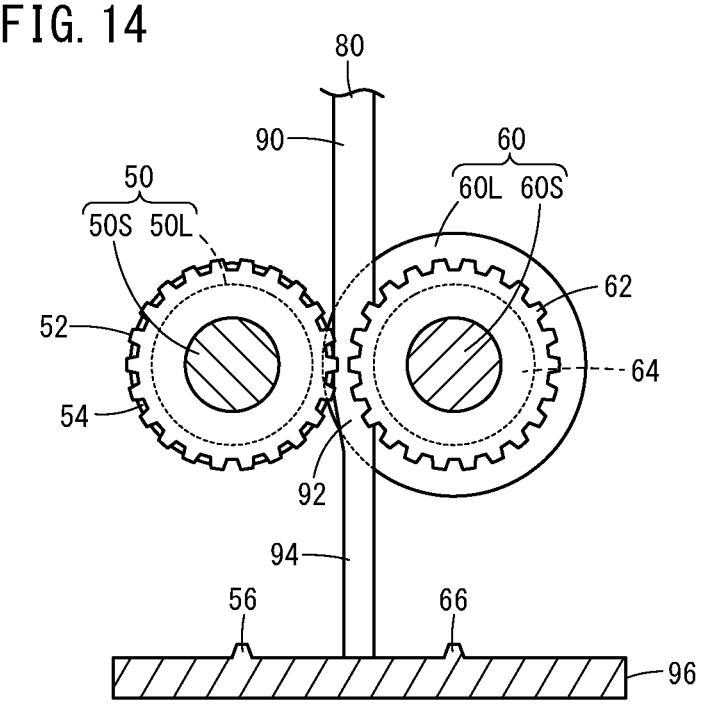
FIG. 14 shows a portion of the gripping mechanism when releasing the first sheet.
Figure 15:
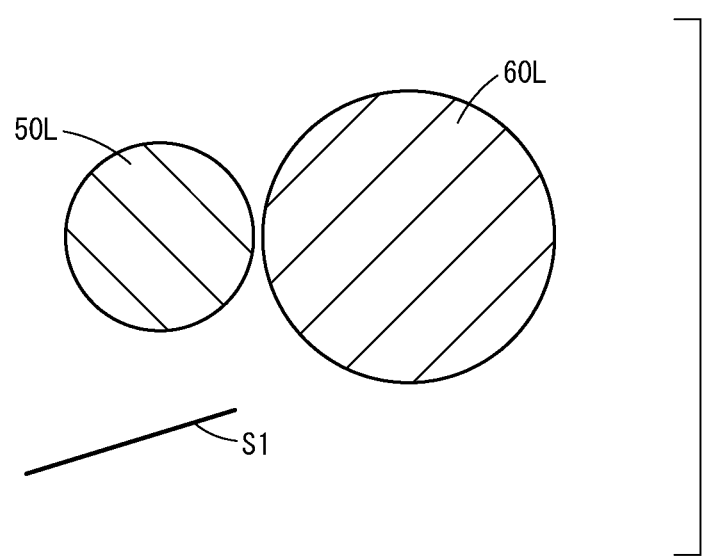
FIG. 15 shows the first roller and the second roller when releasing the first sheet.

When the gripping mechanism 20 moves farther toward the X-direction side from the state shown in FIG. 12, the contact portion 98 of the releasing mechanism 24 presses the second head portion 84 of the rod 80 to the −Y-direction side. At this time, as shown in FIG. 13, the floor portion 96 moves along with the rod 80 toward the −Y-direction side. As a result, the first stopper 56 and the second stopper 66 are removed from between the teeth of the first gear 52 and the second gear 62, respectively, and the first gear 52 and second gear 62 become able to rotate. Furthermore, as shown in FIG. 14, the extending portion 92 of the rod 80 moves toward the −Y-direction side between the first inner bearing 54 and the second inner bearing 64. As a result, as shown in FIG. 15, a space is generated between the first intermediate portion 50L and the second intermediate portion 60L. In this way, the first roller 50 and the second roller 60 become able to rotate, and furthermore, the space is generated between the first roller 50 and the second roller 60, whereby the first sheet S1 is released from the gripping mechanism 20.

Figure 16:
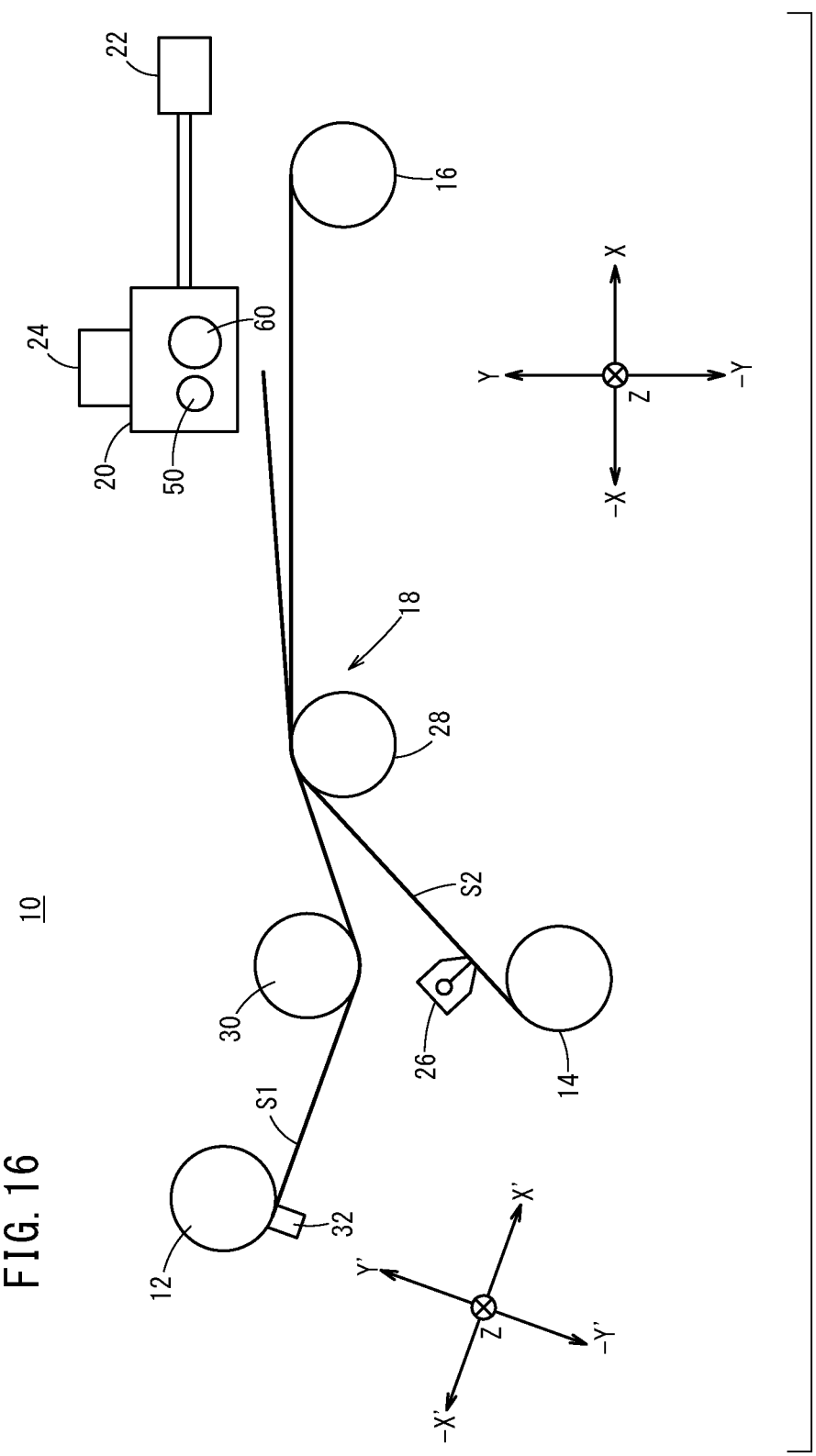
FIG. 16 shows a configuration of the sheet attaching apparatus.

As shown in FIG. 16, the first sheet S1 is attached to the second sheet S2 and, in accordance with the releasing operation of the gripping mechanism 20, moves away from the gripping mechanism 20. After this, the first sheet S1 and the second sheet S2 are attached to each other by the attaching portion 28 and recovered by the recovery roll 16.

6. Modifications

In the embodiment described above, the moving mechanism 22 moves the gripping mechanism 20 linearly along the X direction. Instead of this, the first sheet S1 and the second sheet S2 may be caused to become close to each other by having the moving mechanism 22 move the gripping mechanism 20 circularly in the XY-plane.

Furthermore, an air supply portion that supplies air to the first sheet S1 from the Y-direction side to the −Y-direction side may be provided in the feeding path 18 at a position on a downstream side of the attaching portion 28 and an upstream side of the gripping mechanism 20. The air supply portion assists with the releasing operation of the gripping mechanism 20, and ensures the attachment of the first sheet S1 to the second sheet S2.

In the embodiment described above, the first sheet S1 is attached to the second sheet S2 by causing the moving mechanism 22 to move farther in the X direction than the attaching portion 28. Instead, the first sheet S1 may be attached in the direction of the second sheet S2 by supplying air from the air supply portion toward the first sheet S1. In this case, the air supply portion may be provided near the attaching portion 28, at a position on the −X-direction side of the attaching portion 28. After the air is supplied and the first sheet S1 is attached to the second sheet S2, the gripping mechanism 20 releases its grip. In this case, the degree of freedom of the movement path of the gripping mechanism 20 is increased, and equipment designing becomes easier.

In the embodiment described above, the grip of the gripping mechanism 20 on the first sheet S1 is released by having the second head portion 84 of the rod 80 of the gripping mechanism 20 contact the contact portion 98 of the releasing mechanism 24 such that the rod 80 is pressed down. Instead, a configuration may be used in which the rod 80 is lowered by an electric motor or the like when movement of the moving mechanism 22 by a prescribed distance toward the X-direction side has been sensed.

7. Technical Concepts Obtainable from the Embodiment

The following describes technical concepts that can be understood from the embodiment and modifications described above.

A first aspect of the present invention is, a sheet attaching apparatus 10 that stacks and attaches a first sheet S1 onto a second sheet S2, the sheet attaching apparatus 10 comprising:

a first supply roll 12 that has the first sheet S1 wound thereon and has an axial direction parallel to a prescribed direction (Z direction);

a second supply roll 14 that has the second sheet S2 wound thereon and has an axial direction parallel to the prescribed direction (Z direction);

a recovery roll 16 that recovers the second sheet S2 to which the first sheet S1 is attached;

a feeding path 18 that is formed from the second supply roll 14 to the recovery roll 16;

a gripping mechanism 20 that grips one end portion, in a longitudinal direction, of the first sheet S1 that has been drawn out from the first supply roll 12;

a moving mechanism 22 that allows the first sheet S1 to be attached to the second sheet S2 by moving the gripping mechanism 20 to cause the first sheet S1 to approach and contact the second sheet S2 that passes through an attaching portion 28 provided in the feeding path 18; and a releasing mechanism 24 that releases a grip of the gripping mechanism 20 on the first sheet S1, after the first sheet S1 has contacted the second sheet S2.

According to the above configuration, after the worker has gripped the first sheet S1 with the gripping mechanism 20, the apparatus causes the first sheet S1 to contact and attach to the second sheet S2. In other words, the work of attaching the first sheet S1 to the second sheet S2 is automated at first. Therefore, the work of attaching the first sheet S1 to the second sheet S2 is simplified, and there is no need for the worker to have a high degree of skill.

In the first aspect, the gripping mechanism 20 may include a first gripping portion and a second gripping portion that extend in a width direction of the first sheet S1 (Z direction), and the first gripping portion and the second gripping portion may approach each other to sandwich the one end portion of the first sheet S1.

In the first aspect, the first gripping portion may be a first roller 50 that rotates around an axis parallel to the width direction (Z direction), and the second gripping portion may be a second roller 60 that rotates around an axis parallel to the width direction (Z direction).

According to the above configuration, it is possible for the first roller 50 and the second roller 60 to rotate when the grip on the first sheet S1 is released, and therefore the release of the first sheet S1 from the gripping mechanism 20 can be performed smoothly.

In the first aspect, the gripping mechanism 20 may include stoppers (first stopper 56 and second stopper 66) that set the first roller 50 and the second roller 60 to a non-rotatable state.

According to the above configuration, when the first sheet S1 is being gripped, it is possible to prevent the first sheet S1 from being released from the gripping mechanism 20 due to the rotation of the first roller 50 and the second roller 60.

In the first aspect, the releasing mechanism 24 may release the grip of the gripping mechanism 20 on the first sheet S1 by operating the stoppers (first stopper 56 and second stopper 66) to release the first roller 50 and the second roller 60 from the non-rotatable state.

In the first aspect, the gripping mechanism 20 may include an extending portion 92 that enters between the first gripping portion (first roller 50) and the second gripping portion (second roller 60) and widens a distance between the first gripping portion (first roller 50) and the second gripping portion (second roller 60).

According to the above configuration, the first gripping portion (first roller 50) and the second gripping portion (second roller 60) are moved away from each other when the grip on the first sheet S1 is released, and therefore the release of the first sheet S1 from the gripping mechanism 20 can be performed smoothly.

In the first aspect, the feeding path 18 may bend at the attaching portion 28 in a manner to protrude to the first sheet S1 side, and the moving mechanism 22 may cause the first sheet S1 to contact and attach to the second sheet S2 at a position of the attaching portion 28.

According to the above configuration, the first sheet S1 and the second sheet S2 contact each other and become attached to each other at the attaching portion 28 that bends, and therefore it is possible to increase the pressing force applied to the first sheet S1 and the second sheet S2 during the attachment. As a result, it is possible to firmly attach the first sheet S1 and the second sheet S2.

A second aspect of the present invention is, a sheet attaching method for stacking and attaching a first sheet S1 onto a second sheet S2, at least one of the first sheet S1 and the second sheet S2 being adhesive, the sheet attaching method comprising:

a gripping step of drawing out the first sheet S1 from a first supply portion (first supply roll 12) and gripping one end portion of the first sheet S1 in a longitudinal direction with a gripping mechanism 20;

a first feeding step of drawing out the second sheet S2 from a second supply portion (second supply roll 14), causing the second sheet S2 to pass through an attaching portion 28, and recovering the second sheet S2 with a recovering portion (recovery roll 16);

a moving step of moving the gripping mechanism 20 to cause the first sheet S1 to approach the second sheet S2 passing through the attaching portion 28;

an attaching step of causing the first sheet S1 to contact and attach to the second sheet S2 at a position of the attaching portion 28;

a grip releasing step of, after the attaching step, releasing a grip of the gripping mechanism 20 on the first sheet S1; and a second feeding step of, after the grip releasing step, recovering the first sheet S1 and the second sheet S2 with the recovering portion (recovery roll 16) while attaching the first sheet S1 and the second sheet S2 to each other at the attaching portion 28.

According to the above configuration, the same effect as in the first aspect is realized.

The sheet attaching apparatus and method according to the present invention are not limited to the embodiment described above, and it is obvious that various configurations can be adopted without deviating from the scope of the present invention.

For example, the above embodiment describes an apparatus and method for manufacturing the membrane electrode assembly 200. However, the present invention can be used as any type of manufacturing apparatus and method as long as two or more sheet members are stacked and attached

What is claimed is:

1. A sheet attaching apparatus that stacks and attaches a first sheet onto a second sheet, the sheet attaching apparatus comprising:

a first supply roll that has the first sheet wound thereon and has an axial direction parallel to a prescribed direction (Z direction);

a second supply roll that has the second sheet wound thereon and has an axial direction parallel to the prescribed direction;

a recovery roll configured to recover the second sheet to which the first sheet is attached;

a feeding path that is formed from the second supply roll to the recovery roll;

a gripping mechanism configured to grip one end portion, in a longitudinal direction, of the first sheet that has been drawn out from the first supply roll;

a moving mechanism configured to allow the first sheet to be attached to the second sheet by moving the gripping mechanism to cause the first sheet to approach and contact the second sheet that passes through an attaching portion provided in the feeding path; and a releasing mechanism configured to release a grip of the gripping mechanism on the first sheet, after the first sheet has contacted the second sheet.

2. The sheet attaching apparatus according to claim 1, wherein the gripping mechanism includes a first gripping portion and a second gripping portion that extend in a width direction of the first sheet (Z direction), and the first gripping portion and the second gripping portion approach each other to sandwich the one end portion of the first sheet.

3. The sheet attaching apparatus according to claim 2, wherein
the first gripping portion is a first roller configured to rotate around an axis parallel to the width direction, and
the second gripping portion is a second roller configured to rotate around an axis parallel to the width direction.

4. The sheet attaching apparatus according to claim 3, wherein
the gripping mechanism includes stoppers configured to set the first roller and the second roller to a non-rotatable state.

5. The sheet attaching apparatus according to claim 4, wherein
the releasing mechanism releases the grip of the gripping mechanism on the first sheet by operating the stoppers to release the first roller and the second roller from the non-rotatable state.

6. The sheet attaching apparatus according to claim 2, wherein
the gripping mechanism includes an extending portion configured to enter between the first gripping portion and the second gripping portion and widen a distance between the first gripping portion and the second gripping portion.

7. The sheet attaching apparatus according to claim 1, wherein
the feeding path bends at the attaching portion in a manner to protrude to a side of the first sheet, and
the moving mechanism causes the first sheet to contact and attach to the second sheet at a position of the attaching portion.

* * * * *